May 12, 1970 A. E. PETERMANN 3,510,953
CONTOUR INSPECTING AND COMPARING MACHINE
Filed Dec. 2, 1966 5 Sheets-Sheet 1

INVENTOR.
ARNOLD E. PETERMANN
BY
Wm. H. Dean

May 12, 1970     A. E. PETERMANN     3,510,953

CONTOUR INSPECTING AND COMPARING MACHINE

Filed Dec. 2, 1966     5 Sheets-Sheet 2

INVENTOR.
ARNOLD E. PETERMANN
BY
*Wm. H. Dean*

May 12, 1970        A. E. PETERMANN        3,510,953

CONTOUR INSPECTING AND COMPARING MACHINE

Filed Dec. 2, 1966        5 Sheets-Sheet 5

INVENTOR.
ARNOLD E. PETERMANN
BY
*Wm. H. Dean*

United States Patent Office 3,510,953
Patented May 12, 1970

3,510,953
CONTOUR INSPECTING AND COMPARING MACHINE
Arnold E. Petermann, 3415 E. Pasadena,
Phoenix, Ariz. 85018
Filed Dec. 2, 1966, Ser. No. 598,662
Int. Cl. G01b 5/20
U.S. Cl. 33—174                              6 Claims

ABSTRACT OF THE DISCLOSURE

A contour inspecting and comparing machine comprising means for holding a part to be inspected and a freely, slidably manually movable carriage means supporting and inspecting bar having a pair of feelers, one adapted to engage a machine contoured part, and the other to engage a precision template for comparing the machine part with the template, and wherein the feeler bar is freely, slidably manually movable in two directions at substantially right angles to each other.

---

This invention relates to a contour inspecting and comparing machine, and more particularly, to a contour inspecting and comparing machine for use in inspecting machine parts having compound curvature in relation to a precision template having a desired compound curvature.

Precision inspection of machined parts having compound curvature has presented many difficult problems, and in many instances, has posed the necessity for the utilization of a great deal of time, and numerous instruments for the purpose of production inspection of various geometrical shapes, particularly compound curvatures, which are figures of revolution, which extend axially and radially of an annular part or machined surface.

In the manufacture of precision parts having compound curvatures extending both radially and axially of an annular machined surface, and particularly where the parts are made in volume, manual set up and detail inspection by numerous measurements of said surfaces is prohibitive.

An example of precision parts having compound curvature extending axially and radially of an annular machined surface, may include turbine wheel shrouds, such as those used adjacent centripetal turbine wheels; the shrouds being most efficient when they are precisely spaced relative to the contoured edges of the turbine blades, therefore the requirement for precision inspection of such compound curvatures becomes critical, and particularly difficult to attain in volume production with ordinary inspection means and methods.

Accordingly, it is an object of the present invention to provide a contour inspecting and comparing machine which is capable of precisely inspecting and comparing machined surfaces having compound curvature with a precision template of the desired curvature, and whereby such machined surfaces of parts may be quickly and economically inspected with a high degree of accuracy.

Another object of the invention is to provide a contour inspecting and comparing machine which is very simple and economical of construction in comparison to its precise performance, and production capacity.

Another object of the invention is to provide a contour inspecting and comparing machine, which is very simple and easy to operate, and which will precisely indicate the degree to which a contoured surface may be over machined or under machined, and to indicate such discrepancies within ten thousandths of an inch.

Another object of the invention is to provide a novel contour inspecting and comparing machine, wherein the machine is provided with means for holding a part having compound curvature, and wherein a feeler bar tag is rectilinearly mounted in two directions at right angles to each other on the frame of the machine, and whereby the bar carries a feeler means adapted to traverse the curvature of a part being inspected, and other feeler means adapted to traverse the curvature of a precision template carried by the machine, and whereby means is provided for precisely adjusting the location of the template relative to the part being inspected so as to coordinate the two feeler means on the bar with relationship to the precise curvature which is desired, and which may be inspected in relation to the template.

Another object of the invention is further to provide a machine of the foregoing character, wherein a precision template may be generated from a precisely machined part having the desired compound curvature to be duplicated in subsequent production.

Another object of the invention is to provide a contour inspecting and comparing machine, having novel means for precisely holding parts to be inspected.

Another object of the invention is to provide a contour inspecting machine having novel freely, manually and slidably movable feeler bar guiding carriage mechanism of every precise construction.

Further objects and advantages of the invention may be apparent from the following specification, appended claims, and accompanying drawings, in which:

Figure 1:
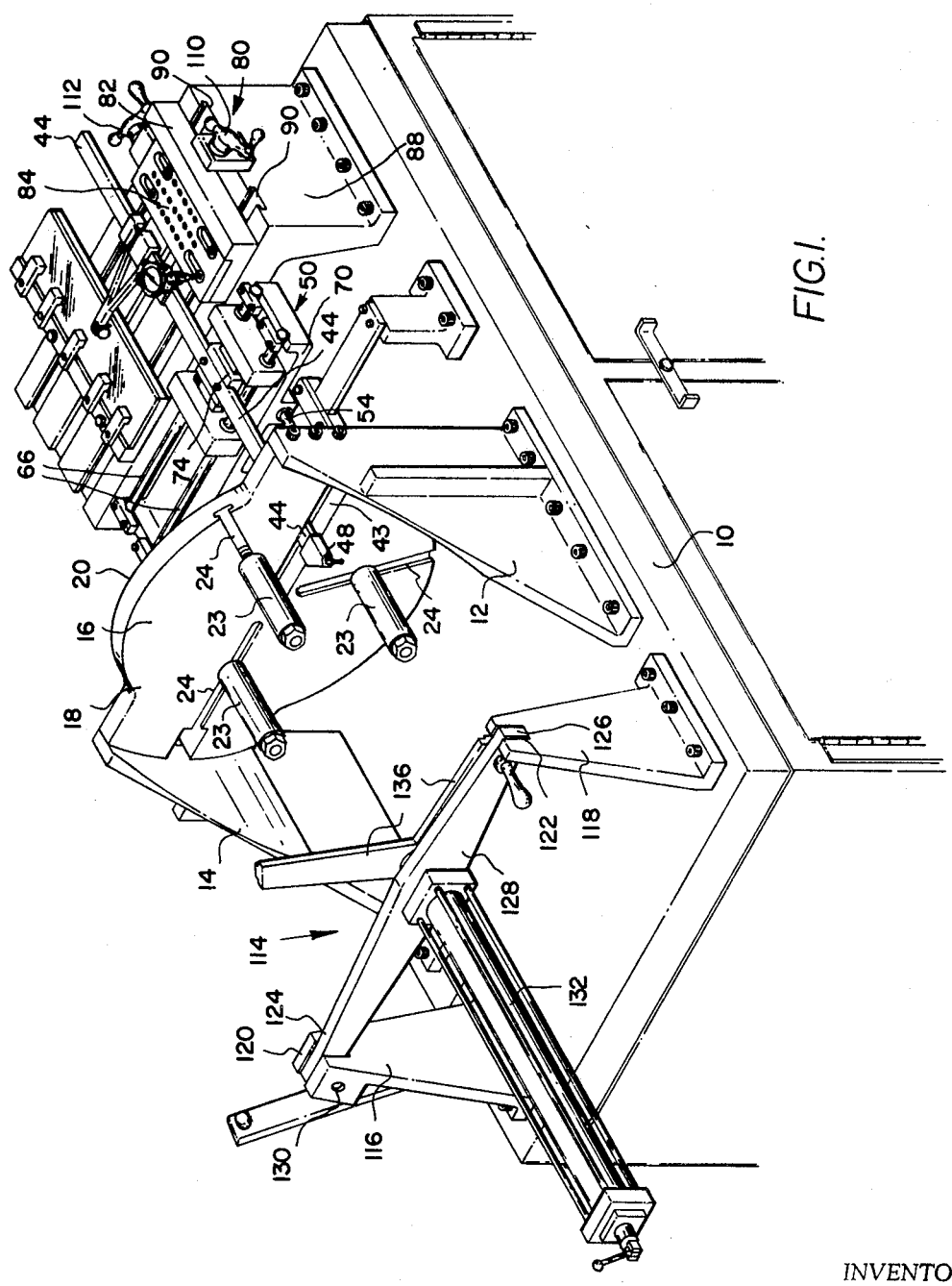
FIG. 1 is a perspective view of a contour inspecting and comparing machine of the present invention.
Figures 2, 4:
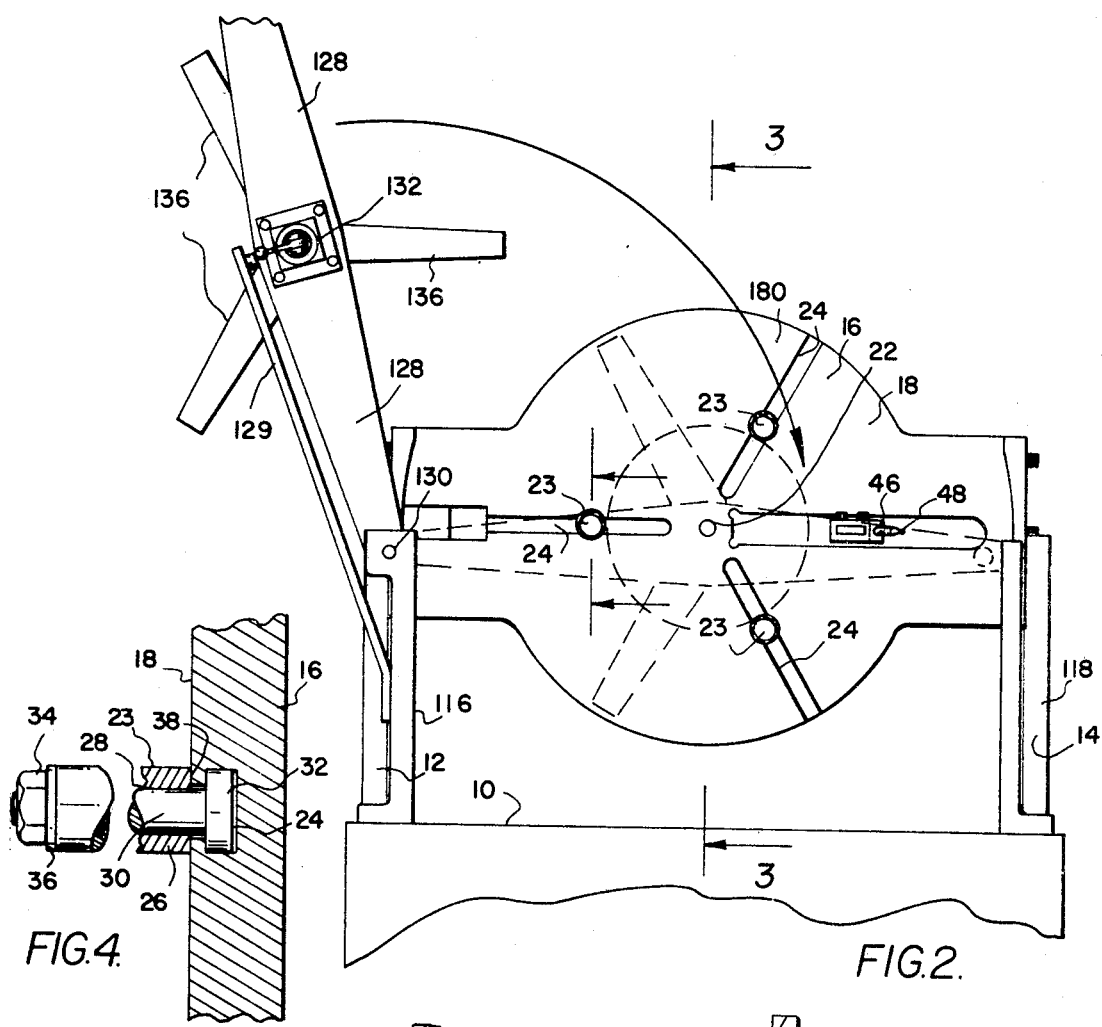
FIG. 2 is a fragmentary end view thereof, showing a varying position of mechanism of the part holding means of the machine in relation to the position of such mechanism shown in FIG. 1.
FIG. 4 is an enlarged fragmentary sectional view taken from the line 4—4 of FIG. 2, showing parts and portions in elevation to facilitate the illustration.
Figure 9:
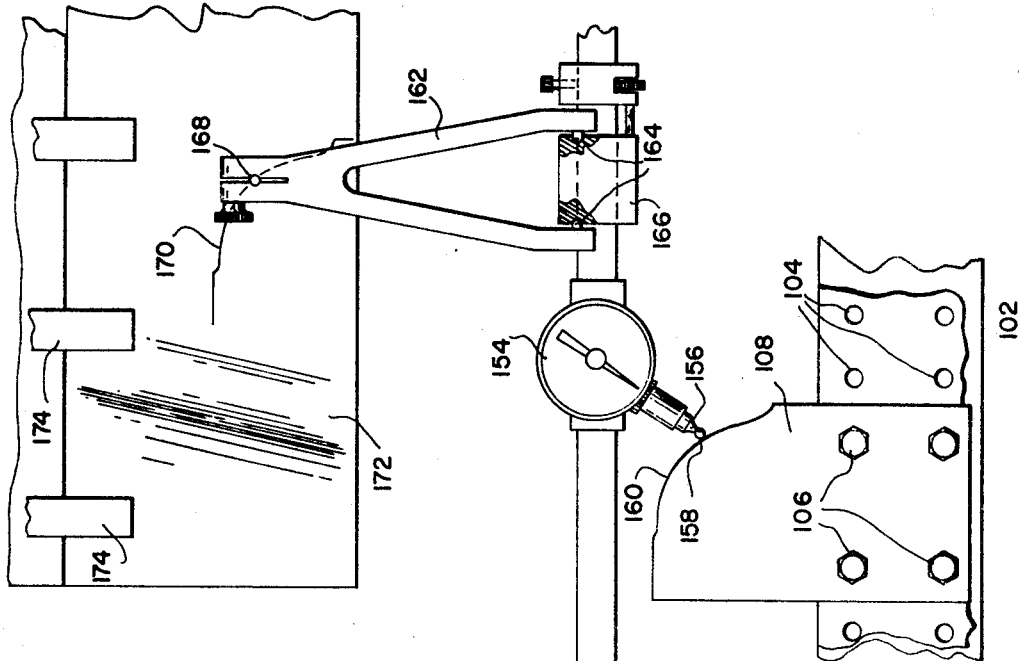
FIG. 9 is a fragmentary plan sectional view of portions of the machine indicating the manner in which the contour feeler means on the feeler bar of the invention contacts contoured machine surfaces of a part being inspected, and of a precision template, respectively, and further, showing means for generating a precision template from a machined part having desired contour curvature.
Figure 9:
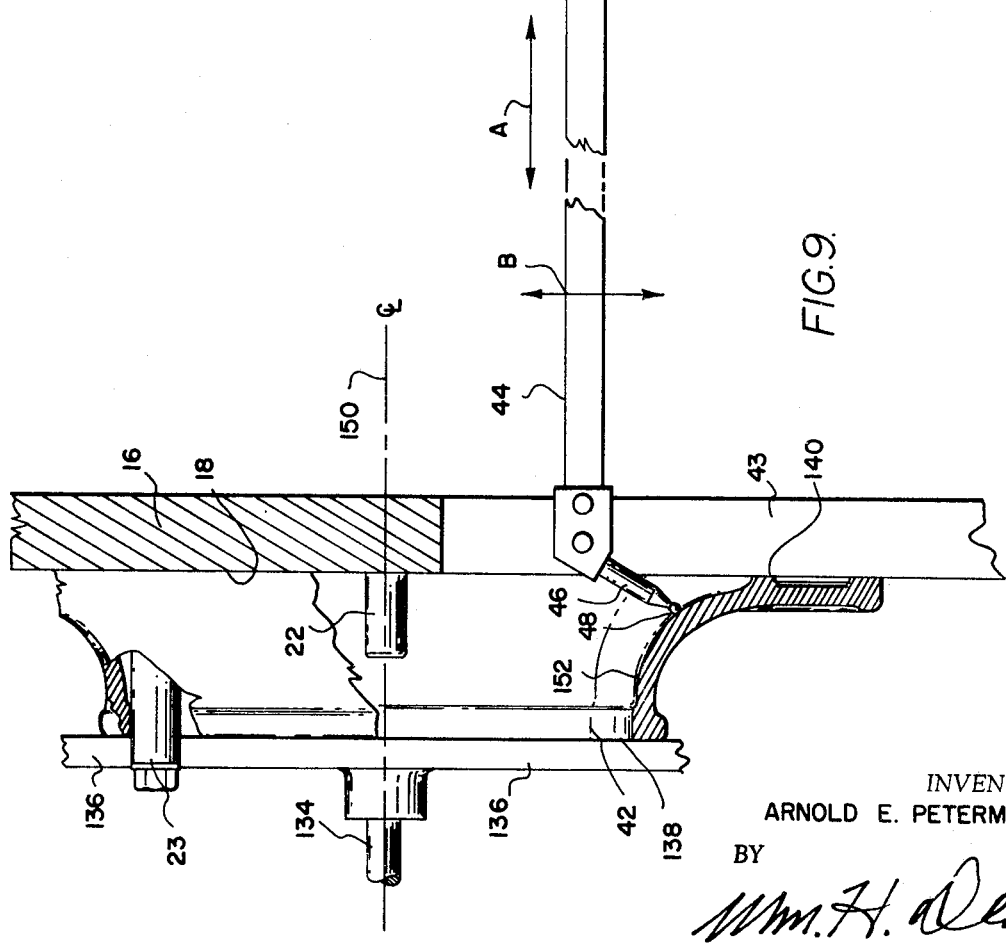

The machine of the invention is provided with a rigid frame 10. Mounted on the frame 10 are spaced upstanding members 12 and 14. These members 12 and 14 are rigidly connected to the frame 10, and are connected rigidly to support a part holding plate 16. This plate 16 is provided with generally vertical surfaces 18 and 20. The surface 18 being operable as a surface plate against which parts to be inspected may be clamped, as will be hereinafter described. This plate, as shown in FIGS. 2 and 9, is provided with a centrally located locating pin 22 adapted to serve as a reference for setting part locators 23 in radially spaced relationship therewith, and in connection with said plate 16. The part locators are fixed in connection with radiating T-slots 24 machined in the plate 16. These T-slots 24 extend radially from the center pin 22, and are as shown in FIGS. 1, 2 and 4 of the drawings. As shown in FIG. 4, each part locator 23 is provided with a hollow cylindrical member 26 provided with a bore 28 in which a T-bolt 30 is positioned. A T-head 32 of each bolt 30 is positioned in the respective T-slot 24, and a nut 34 screw threaded on the bolt 30 bears against a washer 36 for clamping the member 26 at its end 38 securely against the part engaging surface 18 of the part holding plate 16. Loosening and tightening of the nut 34 relative to the respective bolt 30 permits the T-head 32 to be moved radially in the respective slot 24, and thus each part locator 23 may be precisely located radially with respect to the center pin 22, and thus the part holder 22 may engage a peripheral portion 40 of a part 42, shown in FIG. 9 of the drawings, the part 42 being an annular part, thus located concentrically with relation to the center locating pin 22.

The plate 16 is provided with another radially disposed slot designated 43. This slot 43 extends through the plate from its surface 18 to its surface 20, and a feeler bar 44 extends through said slot, as shown best in FIGS. 1 and 9 of the drawings. This feeler bar 44 is provided with a first contour feeler means 46 having a conventional feeler nib 48 of generally spherical form.

Figure 5:
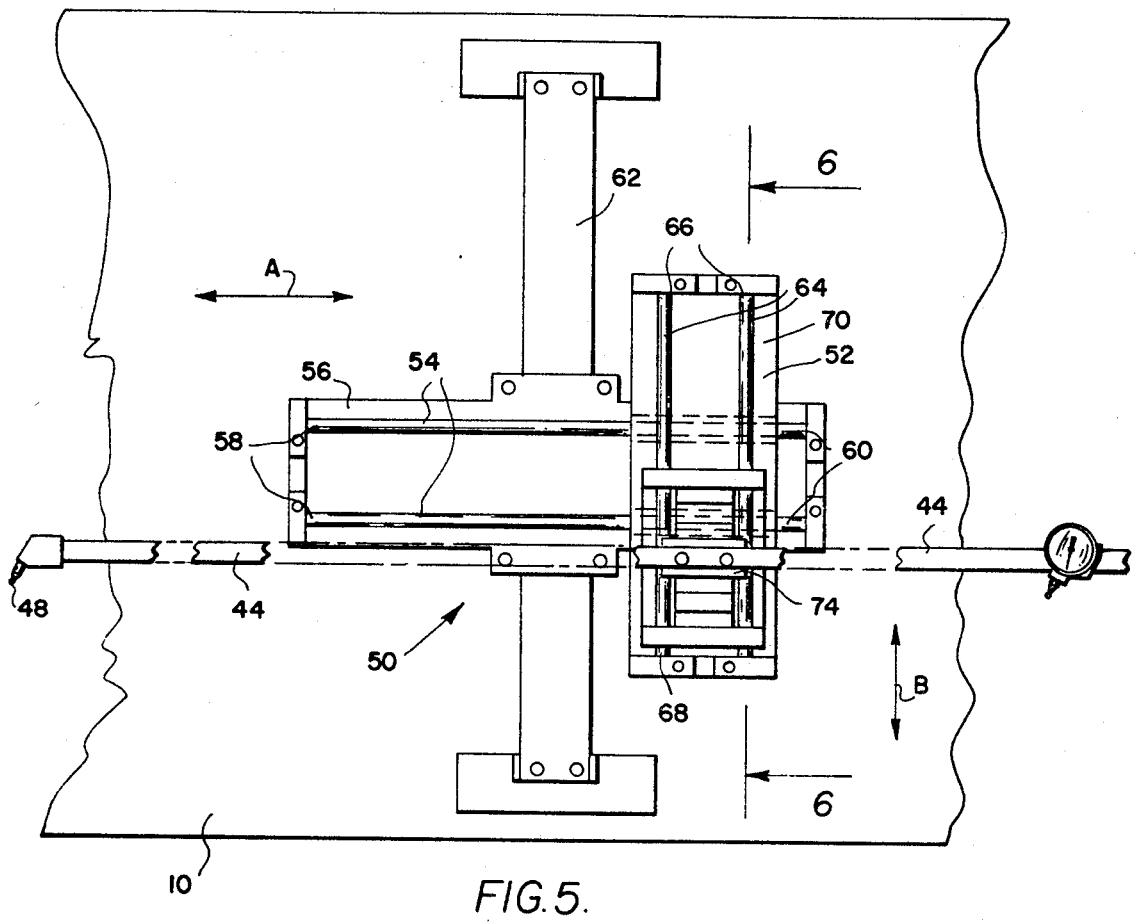
FIG. 5 is an enlarged fragmentary plan view of the feeler bar and feeler bar supporting carriage mechanism of the invention.
Figure 6:
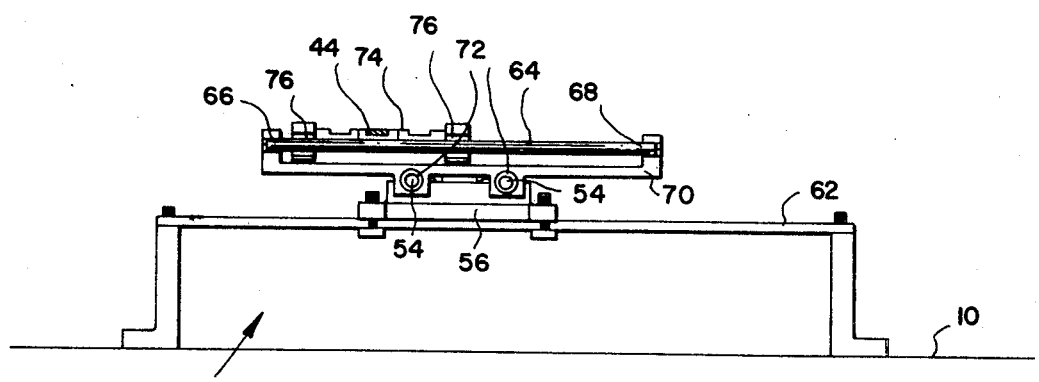
FIG. 6 is a fragmentary sectional view taken from the line 6—6 of FIG. 5.

The bar 44, as shown in FIGS. 1 and 9, is supported on a feeler carriage assembly, designated 50, which is also shown in detail in FIGS. 5 and 6 of the drawings. The feeler bar is freely, movably slidable manually. The feeler bar carriage assembly 50 is provided with a first carriage 52 which moves freely and slidably in rectilinear directions, as indicated by a double ended arrow A with relation to the frame 10. The first feeler bar carriage 52 is mounted on slide bars 54, which are in spaced parallel relationship to each other, and secured to a plate 56 at opposite ends 58 and 60 of the slide bars 54. The plate 56 is rigidly connected to a cross plate 62 fixed to the frame 10.

The first feeler bar carriage 52 is provided with a pair of spaced slide bars 64 which are parallel to each other, and similar to the bars 54. These bars 64 are connected at their opposite ends 66, and 68 to a base member 70 having bearings 72 precisely fitted on and freely slidable along the bars 54. The feeler bar carriage assembly 50 also includes a second carriage 74 having bearings 76 similar to the bearings 72, and these bearings 76 are freely slidably movable along the bars 64 of the first carriage. The second carriage 74 rigidly mounts the feeler bar 44, and the second carriage 74 is freely and slidably movable along the bars 64 in rectilinear directions, as indicated by the double ended arrow B in FIG. 5 of the drawings.

The bearings 72 and 76 of the first and second carriages of the carriage assembly 50 are preferably of a conventional ball-type bearing of very low frictional characteristics. These bearings mounted on the respective slide bars 54 and 64, respectively, are precisely fitted so that the feeler bar 44 does not deviate in a direction laterally of its longitudinal axis. The slide bars 54 and 64 are preferably precision machined, and subsequently precision plated with a hard coating, such as chromium, or the like, to provide for extremely close tolerance fitting of the bearings 72 and 76 on the bars 54 and 64, respectively. Thus, the feeler arm 44 is precisely aligned at all times and freely slidably movable manually in a rectilinear direction, in accordance with the arrow A and/or the arrow B, which correspond with relative movement of the first and second carriages of the feeler arm carriage assembly 50.

Figure 7:
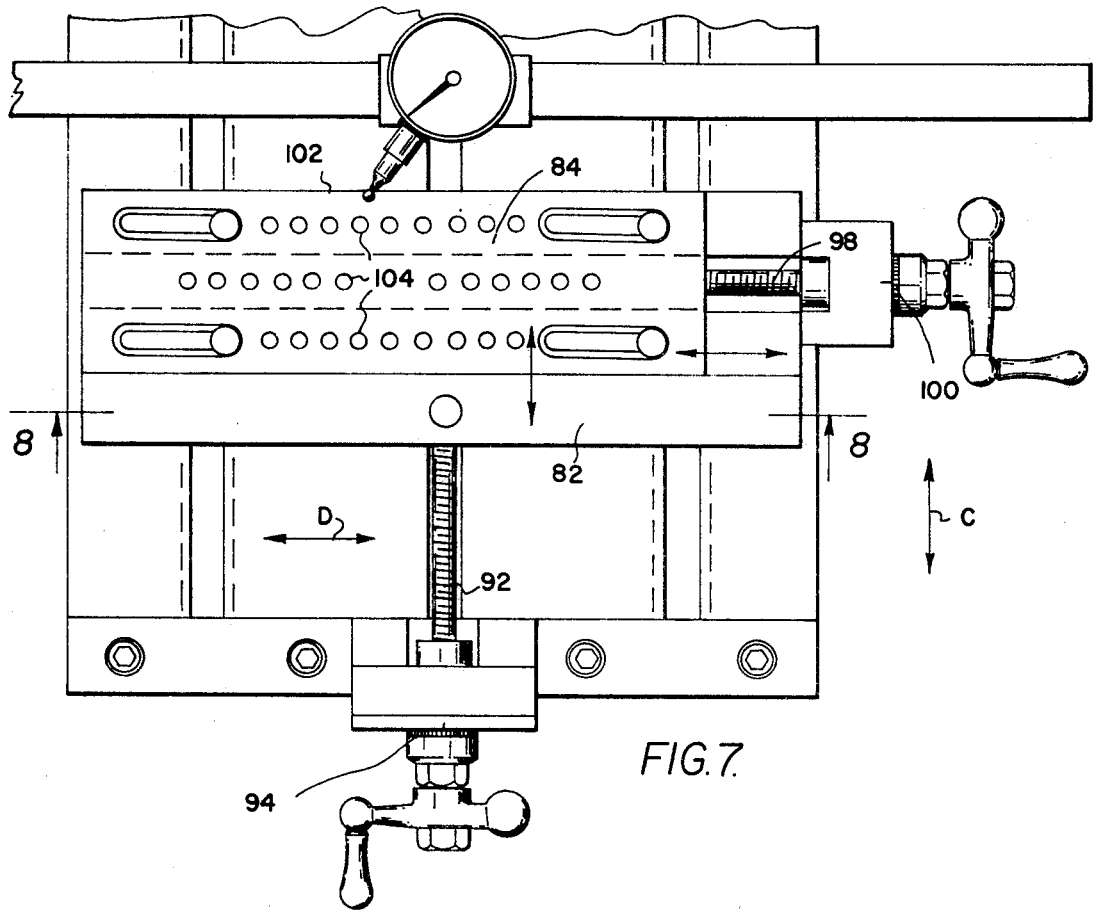
FIG. 7 is an enlarged fragmentary plan view of the template holding fixture carriage mechanism of the invention.
Figure 8:
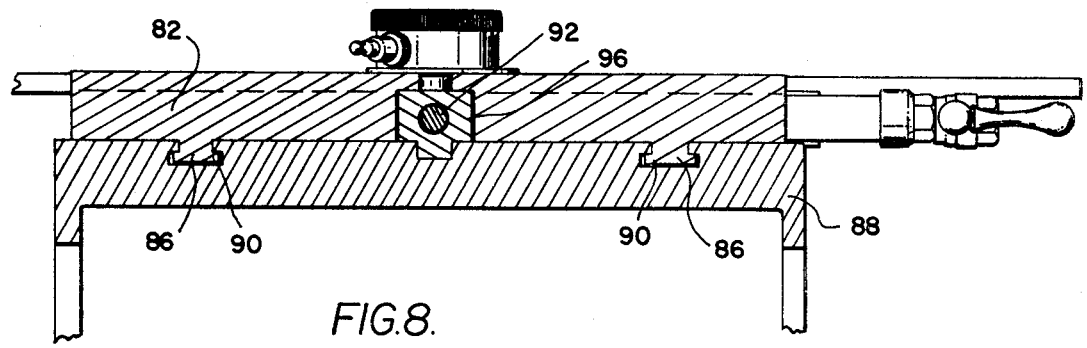
FIG. 8 is a fragmentary sectional view taken from the line 8—8 of FIG. 7.

A template supporting fixture means, generally designated 80 in FIG. 1, comprises a pair of first and second fixture carriages designated 82 and 84, respectively. The fixture carriages 82 and 84 are disclosed in detail in FIGS. 7 and 8 of the drawings, wherein the fixture carriage 82 is mounted to move in rectilinear directions according to a double ended arrow C in FIG. 7, relative to the frame 10, and being in a direction laterally with respect to the longitudinal axis of the feeler bar 44, while the second carriage 84 is movable in rectilinear directions, in accordance with a double ended arrow D, shown in FIG. 7, and relative to the frame 10. The carriage 84, thus, being movable in a direction parallel to the longitudinal axis of the bar 44.

The carriage 82 is provided with rectilinear gibs 86 carried by a base 88 mounted on the frame 10. The gibs 86 run in conforming slots 90 on the base 10 and a micrometer lead screw 92 having a micrometer head 94 thereon is carried by the base 88 to control precision movement of the fixture carriage 82 back and forth in directions, according to the double ended arrow C. The lead screw 92 is screw threaded into a nut 96 carried by the carriage 82, and mounted on the carriage 82 is a second lead screw 98 having a micrometer head 100, and a nut engaging the lead screw 98 is mounted on the underneath side of the second fixture carriage 84, which moves in directions of the double ended arrow D, in a rectilinear fashion upon the carriage 82.

The carriage 84 is provided with a mounting plate 102 having fixture holes 104 which are internally screw threaded, and adapted to receive screws 106 for holding a template 108 thereon, as indicated best in FIG. 9 of the drawings.

The lead screws 92 and 98 are provided with respective hand cranks 110 and 112 for use in manually adjusting the carriages 82 and 84 relative to the machine frame 10, and the bar 44 to carry the template 108 into a position relative to the part 42, shown in FIG. 9 of the drawings, as will be hereinafter described in detail.

Spaced from the part holding plate 16 is a part holding clamp means 114. This part holding clamp means is provided with an upstanding member 116 secured to the frame 10 at one side of the axis of the plate 16, while a second upstanding member 118 is secured to the frame 10. The upstanding members 116 and 118 are notched at 120 and 122, respectively, to receive opposite end portions 124 and 126 of a clamping mechanism cross bar 128. The end 124 of the bar 128 is pivoted on a pin 130, which extends through the upper end of the upstanding member 116.

Figure 3:
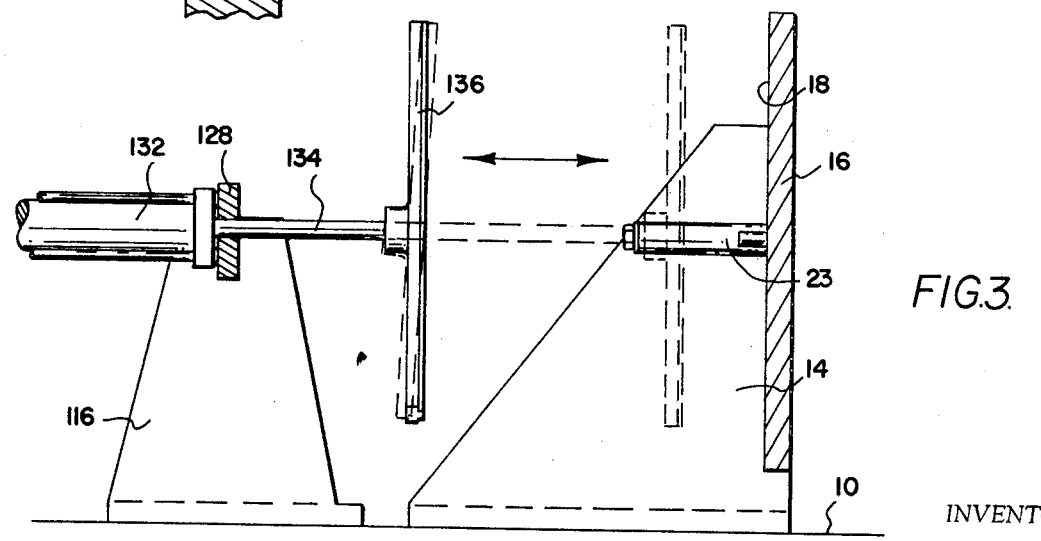
FIG. 3 is a fragmentary sectional view taken from the line 3—3 of FIG. 2, showing varying positions of the part holding mechanisms by broken lines.

A pressure fluid cylinder 132 is provided with a plunger 134, as shown in FIG. 9 of the drawings, and also in FIG. 3 of the drawings. Carried on this plunger 134 is a spider-shaped clamp 136, which is adapted to engage an end 138 of a part 42 opposite to a surface 140 of the part, which engages the part holding surface 18 of the plate 16, all as shown best in FIG. 9 of the drawings. Thus, when the plunger 134 is extended, the spider clamp 136 engages a part and holds it against the surface 18 of the plate 16, while the periphery 40 of the part 42 is engaged between the part locators 22, hereinbefore described.

Thus, a part 42, as shown in FIG. 9 of the drawings, may be securely held in concentric relationship with the center pin 22, and in engagement with the surface 18 of the plate 16. The part 42 is only representative of one configuration of a part that may be inspected by use of the machine of the invention. This particular part is annular about a center line 150, and is provided with a precisely machined surface 152, which extends radially, and longitudinally of the center line 150 so as to provide a compound curve engageable by the nib 48 in connection with the bar 44. The bar 44 adjacent the template 108 is provided with a dial indicator 154 having a second template feeler means 156 provided with a nib 158 which engages a curved surface 160 of the template 108, said curved surface 160 being the means by which the surface 152 of the part 42 may be inspected or compared.

The dial indicator 154 is set on zero so that a reading either over or under a desired dimension may be observed. As for example, if the curved surface 152 is over machined, the dial indicator may indicate this in one direction, and if the surface 152 is under machined, the dial indicator will indicate an opposite condition. Thus, if the dial indicator is zeroed, it will show either a plus or a minus condition of material existing at the surface 152.

It will also indicate the area in which this condition is apparent with relation to the curve on the template 108.

It will be understood that the carriage assembly 50 freely permits the bar 44 to move so that the nib 48 connected thereto may follow the machined surface 152, and the nib 158 following the template 60 may indicate the accuracy of the machined surface 152 relative to the fixed curve surface 160 of the template 108.

The carriages 82 and 84 of the fixture carriage assembly 80 may be adjusted precisely to locate the template longitudinally of the axis 150 or laterally thereof to place the template curve 160 in correspondence with the desired or machined surface 152 on the part 42.

It will be obvious that many varied compound curvatures of various diameters and longitudinally and radial configurations may be inspected by the machine of the invention, all of which may be within the stroke capability of the feeler bar carriage assembly 50, and the template fixture carriage assembly 80.

Removably secured to the bar 44 is a scribing arm 162 carried by gimbal bearings 164 on a block 166 mounted on the arm 44. A scribing point 168 is adapted to scribe a curve 170 corresponding to the curved surface 160, the curve 170 being scribed on template stock 172 which may be covered with blue, or the like to provide for accurate scribing of the curve 170. The template stock 172 is held by clamps 174 on the frame 10.

The curve 170 is scribed by following the curved surface 152 of a carefully inspected machined part by moving the nib 48 thereover, and thus actuating the bar 44 laterally in the direction of the arrow B and longitudinally in the direction of the arrow A, and thus the original template 108 may be produced for use in subsequent checking of subsequently produced parts 42.

The parts 42 may readily and quickly be loaded into position adjacent the surface 18 of the plate 16 by placing the parts between the part locator 22 with the bar 128 moved to the position, shown in FIG. 2, wherein it rests against a rest arm 129, which is secured to one side of the upstanding member 116.

I claim:
1. In a contour inspecting and comparing machine, the combination of: a frame; a part holder on said frame; a manually movable feeler bar carriage assembly having a first carriage freely, slidably, manually movable on said frame in a first direction; a second carriage freely, slidably, manually movable on said first carriage in a second direction at substantially right angles to said first direction; a feeler bar mounted on said second carriage; a first contour feeler means on said feeler bar, and adapted to traverse a contoured surface of a part held on said part holder; first fixture means for holding a contoured template in spaced relation to said part holder; a contoured template fixed to said first fixture means in juxtaposition relative to said part holder, said template having a contoured surface with which the contour of a desired part must conform; a second contour feeler means adapted to traverse said contoured surface of said template; and a deflectable indicator means operable by one of said contour feeler means, and adapted to indicate a lack of conformity of a contour surface of a part relative to the contoured surface of said template, said part holder comprising a plate fixed to said frame, said plate having a part engaging surface disposed at right angles to both movement directions of said feeler bar carriage and having a pair of spaced apart locators radially adjustably mounted relative to each other on said plate.

2. The invention, as defined in claim 1, wherein: clamp means is provided for holding a part against said plate, and between said part locators.

3. The invention, as defined in claim 2, wherein: said part locators are disposed to engage the periphery of an internally contoured ring-shaped part.

4. The invention, as defined in claim 2, wherein: said clamp means is movable axially with relation to said feeler bar, and laterally with respect to said plate for applying holding force to said part in a direction substantially parallel to the axis of said feeler bar.

5. The invention, as defined in claim 2, wherein: said clamp means is movable axially with relation to said feeler bar, and laterally with respect to said plate for applying holding force to said part in a direction substantially parallel to the axis of said feeler bar; said clamp means including a fluid pressure cylinder having a plunger, radially disposed arms carried by said plunger, and adapted to engage a part on said part holder; means pivotally mounting said pressure fluid cylinder for pivotal movement laterally of alignment with said part holder, when the plunger of said pressure fluid cylinder is retracted to thereby permit parts to be engaged with, and removed from said part holder.

6. The invention, as defined in claim 1, wherein: center means is disposed on said plate usable to locate said radially adjustable locators relative to said center; said plate provided with a radial slot through which said feeler bar projects, and whereby said first contour feeler means is carried at an opposite side of said plate from said feeler bar carriage assembly.

References Cited
UNITED STATES PATENTS

| 2,202,638 | 5/1940 | Praeg | 33—179.5 |
|---|---|---|---|
| 1,928,373 | 9/1933 | Flatter. | |
| 3,353,275 | 11/1967 | Porath. | |

SAMUEL S. MATTHEWS, Primary Examiner